Aug. 7, 1934.   R. W. LOWRIE ET AL   1,969,310
TURNTABLE FOR RADIO CHASSIS AND THE LIKE
Filed March 16, 1933   2 Sheets-Sheet 1
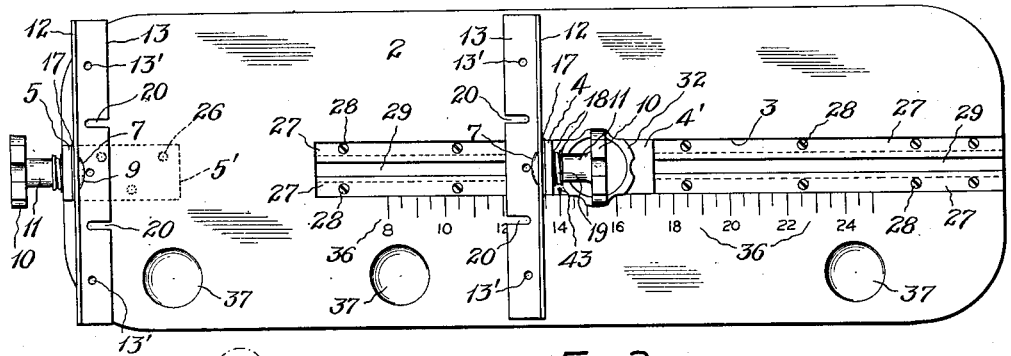
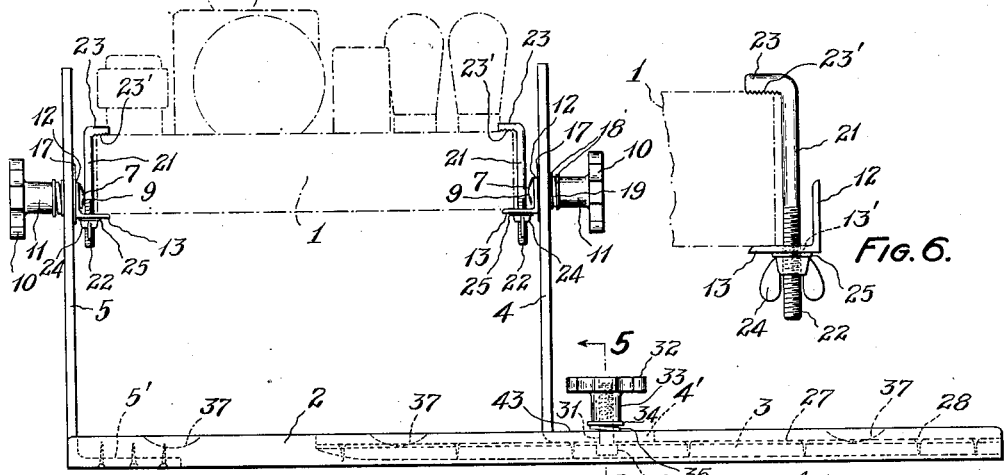
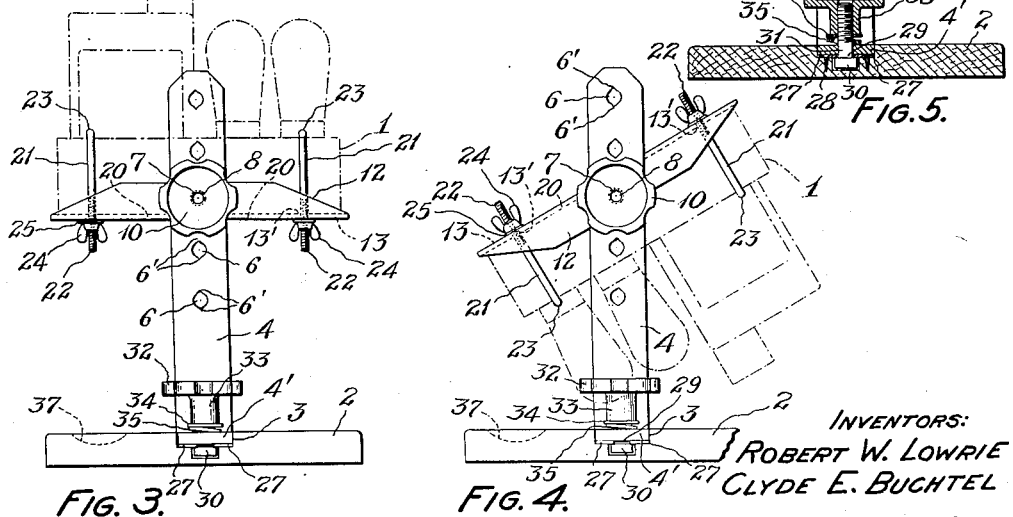
INVENTORS:
ROBERT W. LOWRIE
CLYDE E. BUCHTEL
ATTORNEYS

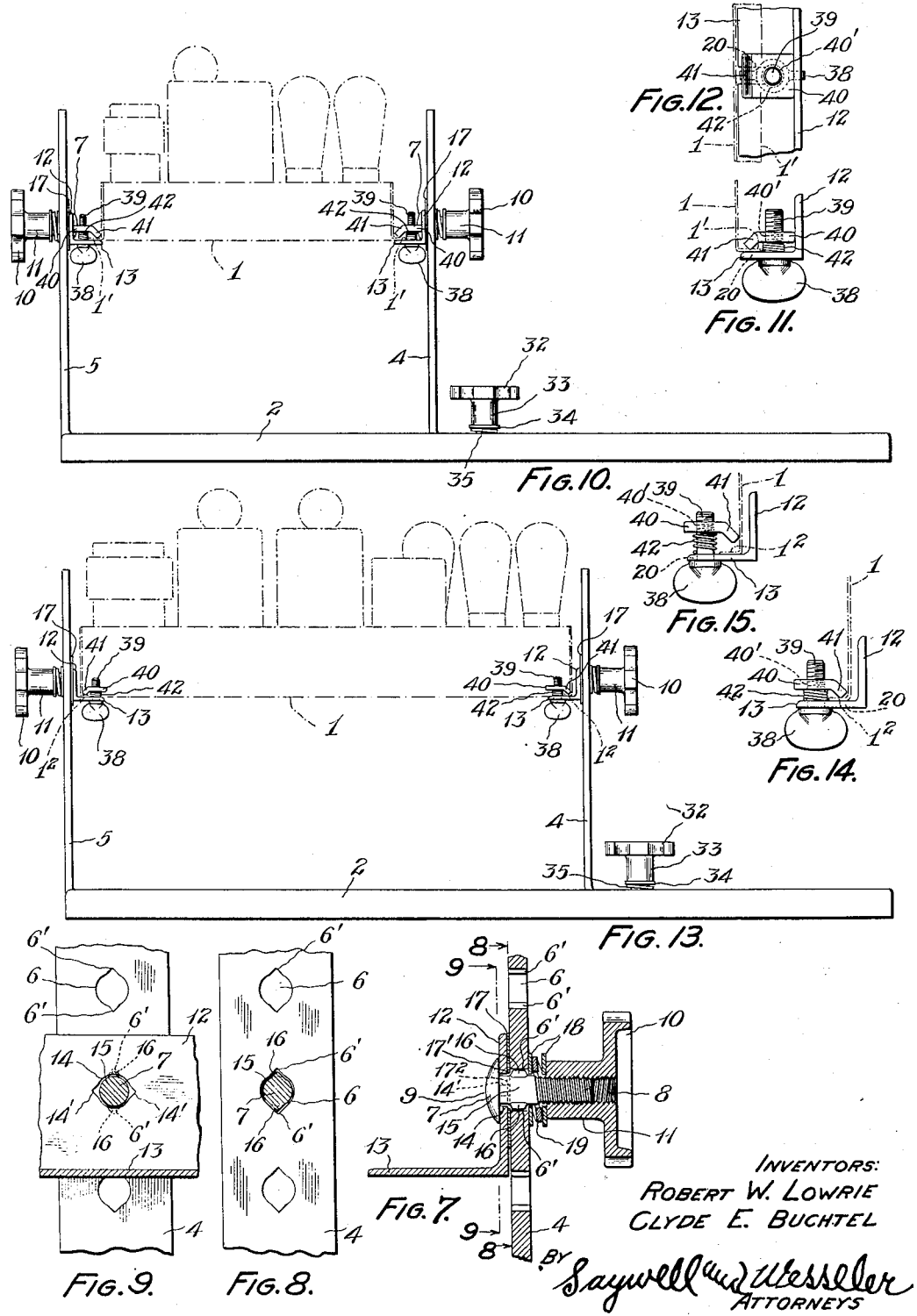

Patented Aug. 7, 1934

1,969,310

UNITED STATES PATENT OFFICE 1,969,310

TURNTABLE FOR RADIO CHASSIS AND THE LIKE

Robert W. Lowrie, Hudson, and Clyde E. Buchtel, Akron, Ohio

Application March 16, 1933, Serial No. 661,122

3 Claims. (Cl. 29—89)

Our invention provides means which will serve to make accessible for assembly, service and repairs all of the parts constituting a radio chassis or like mechanism, which means are simple, economically manufactured, and readily and conveniently assembled and operated. One such "like" mechanism is a chassis for television apparatus. It is well-known that many parts of a radio chassis are inaccessible for assembly, inspection and repair, in the ordinary position of the chassis, and that many of these parts, such as tubes, condensers, terminals, wiring, etc., are quite easily destroyed or damaged if jarred or hit or subjected to other mechanical stresses. Our invention is designed to provide accessibility to all parts for assembly, inspection and repair and avoid damage to delicate parts.

The annexed drawings and the following description set forth in detail certain means embodying our invention, such means disclosing, however, but two of the various forms in which the principle of the invention may be applied.

In said annexed drawings:

Figure 1 is a side view of our improved turntable showing one form of clamping means for mounting a radio chassis thereon, the chassis being suggested in broken lines;

Figure 2 is a plan view of the elements shown in Figure 1, the fastening screws and chassis being omitted;

Figure 3 is an elevation taken from the right-hand side of Figure 1;

Figure 4 is a view similar to Figure 3, but showing the chassis turned to a position which makes the bottom thereof accessible for inspection and repairs;

Figure 5 is a fragmentary vertical transverse section, taken in the plane indicated by the line 5—5, Figure 1;

Figure 6 is an enlarged view of one of the fastening screws shown in Figure 1, the view including a suggestion of a radio chassis, and also showing a transverse angle forming part of the turn-table, to which angle one end of the chassis is fastened by the screw;

Figure 7 is a fragmentary enlarged axial section taken through the pivot for one of the rotatable angles upon which the chassis is supported;

Figures 8 and 9 are transverse vertical sections taken, respectively, in the planes indicated by the lines 8—8 and 9—9, Figure 7;

Figure 10 is a view similar to Figure 1, but shows modified means for mounting and clamping a chassis when the latter is formed with an outwardly projecting flange;

Figure 11 is an enlarged view of the fastening and clamping device shown in Figure 10, the device being shown in clamped position upon the angle and the chassis flange;

Figure 12 is a fragmentary plan view of the elements shown in Figure 11;

Figure 13 is a view similar to Figure 1, but showing a modified form of fastening and clamping device for the chassis when the latter is formed with an inwardly projecting flange;

Figure 14 is an enlarged view of the clamping device shown in Figure 13, the device being shown in clamped position upon the angle and the chassis flange; and Figure 15 is a view similar to Figure 14 but showing the clamping device in released position.

Referring to the annexed drawings in which the same parts are indicated by the same respective numbers in the several views, mechanism such as a radio chassis 1, or the like, is mounted upon a base member 2 by and between vertically-extended standards 4 and 5, of which standard 5 is fixed by a flange 5' and screws 26 in the base member 2; and standard 4 is longitudinally slidable in a slot 3 formed in the base member 2 and is secured in any desired adjusted position by a flange 4' and clamping mechanism hereinafter described, so that the distance between the standards 4 and 5 can be adjusted to suit the character of and the length of the particular chassis which it is desired to support.

The standards 4 and 5 are formed each with a series of vertically spaced holes 6, generally circular in cross-section but somewhat elongated at their tops and bottoms 6', Figures 8 and 9. A bolt 7 formed with a screw-threaded end portion 8 and a portion 15 generally circular in cross-section serves to secure a transverse sill member, such as an angle with the legs 12 and 13, to each of the standards 4 and 5, the leg 12 of the angle being vertically-extended and formed with a central hole 14 generally circular in cross-section but having horizontally extending portions 14', Figure 9. Extending from a part of the circular portion 15 of the bolt 7 are oppositely disposed lugs 16 adapted to register with and be disposed in the extensions 6' of the hole 6 in the standards 4 and 5 in the assembled position of the several parts. Interposed between the leg 12 of the angle and the standard 4 is a spacing disk 17 also formed with a central hole 17' generally circular in cross-section but having diametrically opposed extensions or enlargements 17² similar to the extensions 6' and 14'. A hand wheel 10 having an internally-threaded hub 11 is adapted to engage with the threaded portion 8 of the bolt 7. The bolt 7 is formed with a head 9 upon its end opposite the screw-threaded portion 8 thereof.

It is evident from the aforegoing description that the screw-threaded portion 8 of the bolt 7 can be passed through the holes 14 and 17' in the angle 12 and spacing disk 17, respectively, and through the hole 6 in the standard 4, the angle 12—13 being held in vertical position so as to permit the lugs 16 to pass through the extensions 14' of the holes 14 in the angle 12. The lugs 16 are also passed through the extensions 17² of the hole 17' in the spacing plate 17 and positioned in the extensions 6' of the hole 6 in the standard 4, after which the angle 12—13 is turned to its normal horizontal position, and then the whole assembly locked by tightening the hub 11 of the wheel 10 upon the threaded portion 8 of the bolt 7. In this assembly, we utilize spaced plane washers 18 and an intermediate lock washer 19 between the outer face of the standard 4 and the inner end of the hub 11. A similar assembly is used for each of the standards 4 and 5, and that hole 6 of the various holes in each standard is used which will support the transverse angle 12—13 at the desired height for the particular chassis which is to be mounted thereon.

The leg 13 of the angle is horizontally extended and to the legs 13 of the two angles the chassis is clamped. According to the character of the chassis, different clamping devices are utilized for holding the chassis. In Figures 1, 2 and 6, a clamping device is shown which comprises a screw stud 21 having one end 22 threaded and engageable by a thumb nut 24, the other end of the stem 21 being formed with a hook 23 having a roughened holding surface 23' formed on its under face. The leg 13 of the angle is formed with spaced holes 13' receiving the stems 21 of a pair of the fastening screws so that the chassis can be rigidly supported by clamping the top thereof with the roughened surface 23 and tightening the thumb nut against the under face of the leg 13 of the angle. A washer 25 is provided between the under face of the leg 13 and the thumb nut 24.

In the forms of devices shown in Figures 10 to 15, the chassis supported are those which are formed with either outwardly-extended or inwardly-extended peripheral flanges. For such forms of chassis we provide modified clamping means. In the form shown in Figures 10, 11 and 12 wherein the chassis has an outwardly-projected flange 1', we utilize thumb screws 38 having externally-threaded stems 39 which pass through suitable spaced slots 20 in the legs 13 of the angles and engage tapped holes 40' formed in clamping plates 40 formed with downwardly and outwardly projecting jaws 41 adapted to be drawn down tightly against the inner corner of the flange 1' of the chassis 1, the plates 40 being mounted upon coil springs 42 which by the action of the threaded thumb nuts 38 are placed under tension between the plates 40 and the legs 13 of the supporting angles. The length of the slots 20 is such as to permit longitudinal adjustment of the clamps, whereby slight variations in chassis lengths or flange widths can be accommodated.

In the form of device shown in Figures 13, 14 and 15, wherein the chassis is provided with an inwardly-extended flange 1², the plates 40 are reversed in position so as to cause the jaw 41 tightly to engage the inner corner of the flange 1².

In order to accommodate chassis of varying lengths the standard 4 is longitudinally adjustable on the table 2. This adjustment takes place upon rails 27 fastened by screws 28 to the base 2 at the bottom of the slot 3, the rails 27 being spaced to form a slot 29 which is a runway for the stem 31 of a bolt having a head 30 which slides on the under surfaces of the rails 27, the stem 31 having an externally-threaded upper end portion engaged by a hand wheel 32 having an internally-threaded hub 33, a plane washer 34 and a lock washer 35 being interposed between the outer end of the hub 33 and the top face of the flange 4' of the standard 4.

It is evident that by loosening the hand wheel 32 the standard 4 can be adjusted to the proper position to provide the desired space between the standards 4 and 5 for mounting a chassis of any particular length and then the hand wheel 32 locked again to fix the standard 4 and maintain the desired spacing.

For holding screws and other fittings, and small tools, used in the inspecting and servicing operations, we form the base member 2 with a plurality of pockets 37.

A scale or gauge 36 with one-half inch gradations is provided, by means of which the standard 4 can be set at the proper spacing from the standard 5 for the particular radio chassis which it is desired to treat. The inch markings upon the gauge 36 indicates respectively the proper setting of a base line 43 formed upon one side edge of the flange 4' of the standard 4. When working upon a chassis 1 without flanges, such as shown in Figure 1, the over-all dimension of the chassis 1 is obtained and the standard 4 set at that position in which the base line 43 registers with the inch marking upon the scale 36 which corresponds to the over-all dimension of the chassis. In clamping the chassis 1 the screw stems 21 can be tilted or turned so as to permit the placing of the hook portions 23 over the top edges of the chassis and then the screw can be tightened by the thumb nut 24. When working upon a chassis 1 with an outwardly-extended flange 1', such as shown in Figure 10, the over-all dimension of the chassis 1 including the flange 1' is measured and then the base line 43 set at the corresponding inch measurement upon the scale 36. When working upon a chassis 1, with an inwardly-extending flange 1², such as shown in Figure 13, that dimension of the chassis is obtained which lies between the inner edges of the flange, and the base line 43 set at the corresponding inch measurement upon the scale 36. When the measurements are taken, as above-mentioned, for chassis having flanges, and the chassis is placed upon the legs 13 of the angles 12—13, the jaws 41 of the clamps 40, when the latter are disposed within and at the inner ends of the slots 20, or at the outer ends of the slots 20, depending upon whether the chassis flange extends outwardly or inwardly, just clear the flanges so that they can be moved upwardly beyond the flanges, and then the screws 42 can be moved outwardly of or inwardly of the slots 20, depending upon whether the chassis flange extends outwardly or inwardly, and then the jaw 41 tightened down against the inner corner of the flange.

The chassis 1 is removed from the usual radio cabinet as a unit and clamped upon the legs 13 of the two angles which have been fixed in the standards 4 and 5 at the desired height, the standards 4 and 5 having also been spaced at the desired distance. Then by pressing upon the chassis body or pushing or pulling upon one of the transverse angles 12—13, the chassis 1 can be rotated upon the bolts 7 into the various positions necessary to provide convenient and safe inspection of the various chassis parts and their replacement or such other repairs as is desired. In thus rotating the chassis 1 into different positions, the spacing disks 17 insure smooth uniform turning movements, inasmuch as said disks 17 are always symmetrical about the pivotal axis of the bolt 7. If the legs 12 of the angles turned in contact with the standards 4 and 5, there would be an unequal or unbalanced pull upon the angles, in many positions of the latter, so that a smooth turning movement would not be obtained. The rotating movements of the chassis 1 can be effected by releasing and retightening the hand wheels 10 but the action of the spacing disks 17 is such that satisfactory turning movements of the chassis can be effected without loosening the wheels 10 and at the same time the frictional engagement of the spacing disks 17 with the standards 4 and 5 and the legs 12 of the angles will be such as to insure the rigid holding of the chassis 1 in the desired positions.

What we claim is:

1. An element for use in rotatably mounting radio chassis and the like comprising a vertically-extended standard having a series of vertically-spaced circular holes therethrough, the tops and bottoms of said holes being elongated, an angle having a circular hole in one leg thereof of substantially the size of the holes in the standard, said hole in the angle being horizontally elongated, a headed bolt having a portion circular in cross-section upon which the angle is rotatable, said bolt being formed with lugs adapted to fit within the elongated hole portions of the standard, said bolt having also a threaded portion, a spacing disk interposed between the standard and said leg of the angle, a hand-wheel having an internally-threaded hub portion adapted to engage the threaded portion of the bolt, two plane washers and a lock washer between said hub and the standard, and a clamp for engaging the radio chassis and adjustably secured to the other leg of the angle.

2. An element for use in rotatably mounting radio chassis and the like comprising a standard having a series of spaced elongated holes therethrough, an angle having an elongated hole in one leg thereof of substantially the size of the holes in the standard, a headed bolt having a portion circular in cross-section upon which the angle is rotatable, said bolt being formed with lugs adapted to fit within the elongations of the holes in the standard, means for detachably retaining the bolt in position, and a clamp for engaging the radio chassis and adjustably secured to the other leg of the angle.

3. An element for use in rotatably mounting radio chassis and the like comprising a vertically-extended standard having a series of vertically-spaced circular holes therethrough, the tops and bottoms of said holes being elongated, an angle having a circular hole in one leg thereof of substantially the size of the holes in the standard, said hole in the angle being horizontally elongated, a headed bolt having a portion circular in cross-section upon which the angle is rotatable, said bolt being formed with lugs adapted to fit within the elongated hole portions of the standard, said bolt having also a threaded portion, a hand-wheel having an internally-threaded hub portion adapted to engage the threaded portion of the bolt, and a clamp for engaging the radio chassis and adjustably secured to the other leg of the angle.

ROBERT W. LOWRIE.
CLYDE E. BUCHTEL.